US006938746B2

(12) United States Patent
Skorucak

(10) Patent No.: US 6,938,746 B2
(45) Date of Patent: Sep. 6, 2005

(54) DOG-CLUTCH COUPLING DEVICE

(75) Inventor: Bela Skorucak, Cormeilles en Parisis (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 10/480,306

(22) PCT Filed: Jul. 26, 2002

(86) PCT No.: PCT/FR02/02686

§ 371 (c)(1), (2), (4) Date: Dec. 11, 2003

(87) PCT Pub. No.: WO03/012309

PCT Pub. Date: Feb. 13, 2003

(65) Prior Publication Data

US 2004/0168879 A1 Sep. 2, 2004

(30) Foreign Application Priority Data

Jul. 27, 2001 (FR) ............................................ 01 10123

(51) Int. Cl.[7] ................................................ F16D 11/04

(52) U.S. Cl. .................... 192/69.8; 192/83; 192/89.21; 192/101

(58) Field of Search ............................ 192/54.52, 69.8, 192/83, 89.21, 101

(56) References Cited

U.S. PATENT DOCUMENTS

| | | | | | |
|---|---|---|---|---|---|
| 2,933,171 | A | | 4/1960 | Kraeplin | |
| 4,042,088 | A | * | 8/1977 | Schmohe | 192/114 R |
| 4,086,991 | A | * | 5/1978 | Swadley | 192/82 T |
| 4,244,455 | A | * | 1/1981 | Loker | 192/24 |
| 4,434,881 | A | * | 3/1984 | Denk et al. | 192/89.21 |
| 5,078,249 | A | | 1/1992 | Botterill | |
| 5,103,949 | A | * | 4/1992 | Vanderzyden et al. | 192/24 |
| 5,206,793 | A | | 4/1993 | Boudrant et al. | |
| 5,584,776 | A | | 12/1996 | Engle et al. | |
| 2004/0262112 | A1 | * | 12/2004 | Skorucak | 192/69.82 |

FOREIGN PATENT DOCUMENTS

| | | | |
|---|---|---|---|
| EP | 0 806 580 | A | 11/1997 |
| FR | 2 286 975 | A | 4/1976 |
| FR | 2 667 372 | A | 4/1992 |

* cited by examiner

*Primary Examiner*—Richard M. Lorence
(74) *Attorney, Agent, or Firm*—Lowe Hauptman & Berner, LLP

(57) ABSTRACT

The invention relates to a device for coupling two shafts that are intended to rotate in the continuation of one another with respect to a casing (4). A dog clutch couples the two shafts.

The device comprises clutch-release means allowing the dog clutch (9) to be uncoupled. According to the invention, the clutch-release means comprise a ramp (17) secured to the casing (4), the ramp (17) having a helical shape around the axis (1), a flat disk (19) secured to the first shaft (3) the plane of which is more or less perpendicular to the axis (1), an element (20) intended to roll between the ramp (17) and the disk (19) so as to cause a translational movement of the first shaft (3) with respect to the casing (4) more or less along the axis (1), the translational movement allowing the dog clutch (9) to be uncoupled.

The specific structure of the clutch-release means enables the shafts to be uncoupled while they are in rotation.

12 Claims, 18 Drawing Sheets

A-A

A-A

A-A

A-A

A-A

DOG-CLUTCH COUPLING DEVICE

The invention relates to a device for coupling two shafts that are intended to rotate in the continuation of one another. A dog clutch couples the two shafts. A dog clutch generally comprises teeth or protrusions belonging to each of the two shafts. When the teeth (or protrusions) collaborate with one another, the two shafts are coupled. A dog-clutch coupling device also comprises means for separating the teeth of each shaft in order to uncouple them. These means will be termed clutch-release means in the remainder of the description.

Known clutch-release means entail halting the rotation of the two shafts and applying an external force to separate the teeth. What happens is that the teeth are generally kept in contact by means of a spring and it is therefore necessary to overcome the force of this spring in order to release the clutch.

The object of the invention is to alleviate these difficulties by proposing a dog-clutch coupling device in which the clutch-release means can uncouple the shafts even while these are rotating. Allowing uncoupling during rotation makes it possible to use the clutch-release means as a safety member. They allow rapid uncoupling without having to wait for rotation to stop.

To this end, the subject of the invention is a device for coupling two shafts that are intended to rotate with respect to a casing, in the continuation of one another more or less about an axis, the device comprising a dog clutch allowing one of the shafts to drive the other and clutch-release means allowing the dog clutch to be uncoupled, characterized in that the clutch-release means comprise a ramp secured to the casing, the ramp having a helical shape around the axis, a flat disk secured to the first shaft the plane of which is more or less perpendicular to the axis, an element intended to roll between the ramp and the disk so as to cause a translational movement of the first shaft with respect to the casing more or less along the axis, the translational movement allowing the dog clutch to be uncoupled.

The invention furthermore makes it possible to considerably reduce the force needed for clutch release. By virtue of the invention, the force needed to separate the teeth of the dog clutch is provided not by means external to the device but by the device itself and, more specifically, by the rotational energy of the shafts. The only force needed for clutch release is, by virtue of the invention, a force to move the ball from a position of rest to a position between the ramp and the disk.

The invention will be better understood and other advantages will become apparent from reading the detailed description of one embodiment of the invention, this description being illustrated by the attached drawing in which.

Figure 2:
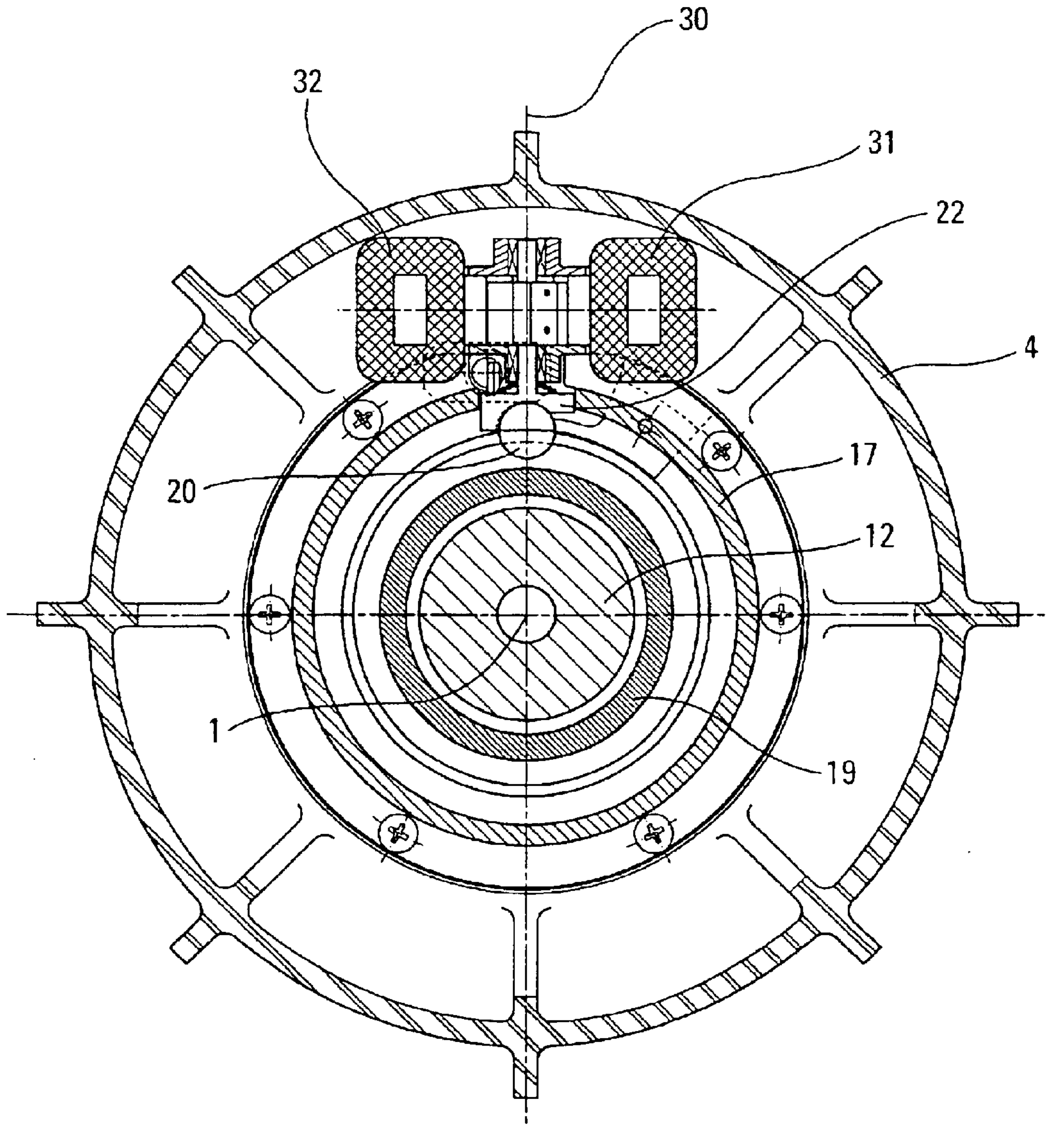
Figure 10:
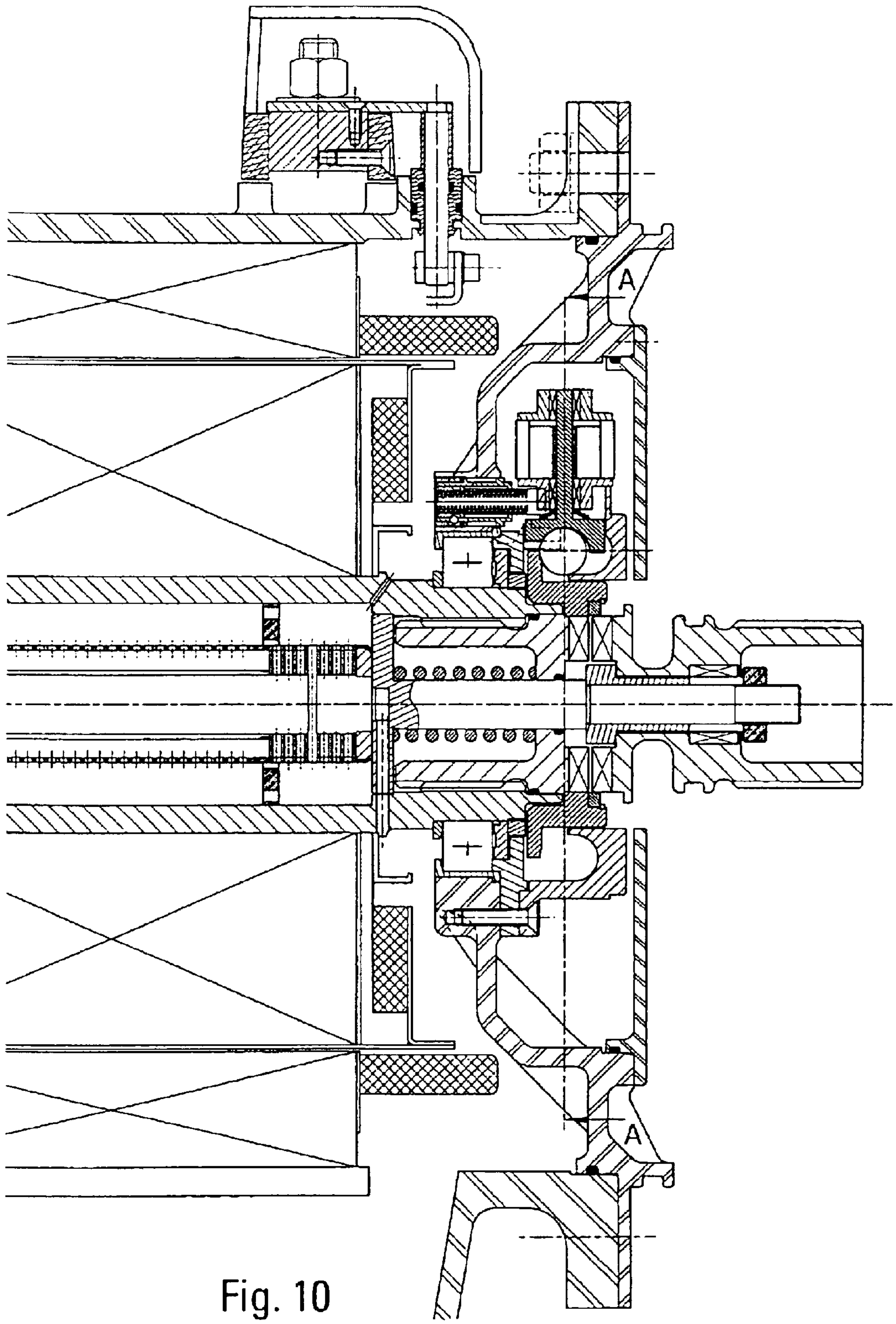
Figure 11:
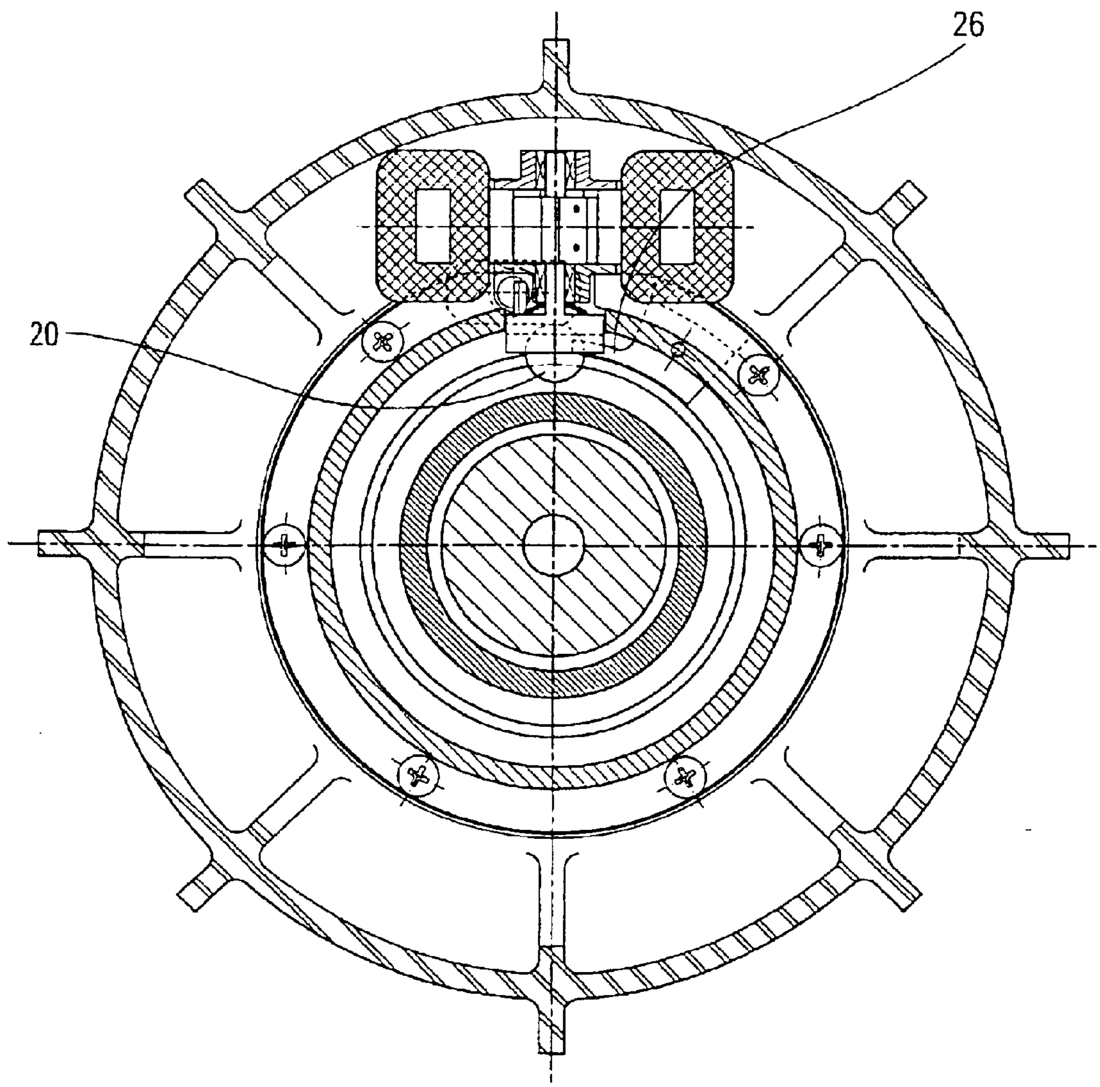
Figure 12:
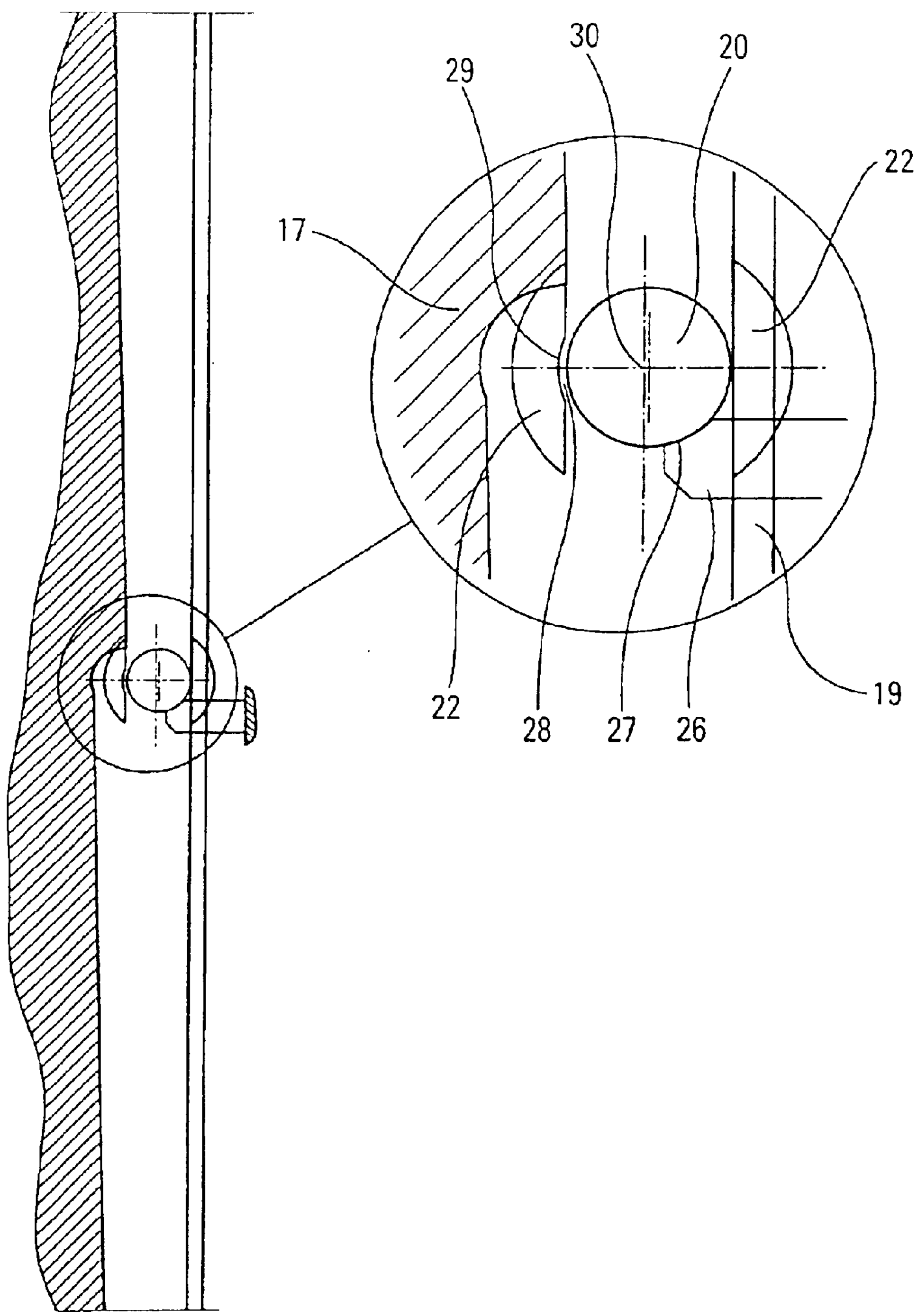
Figure 13:
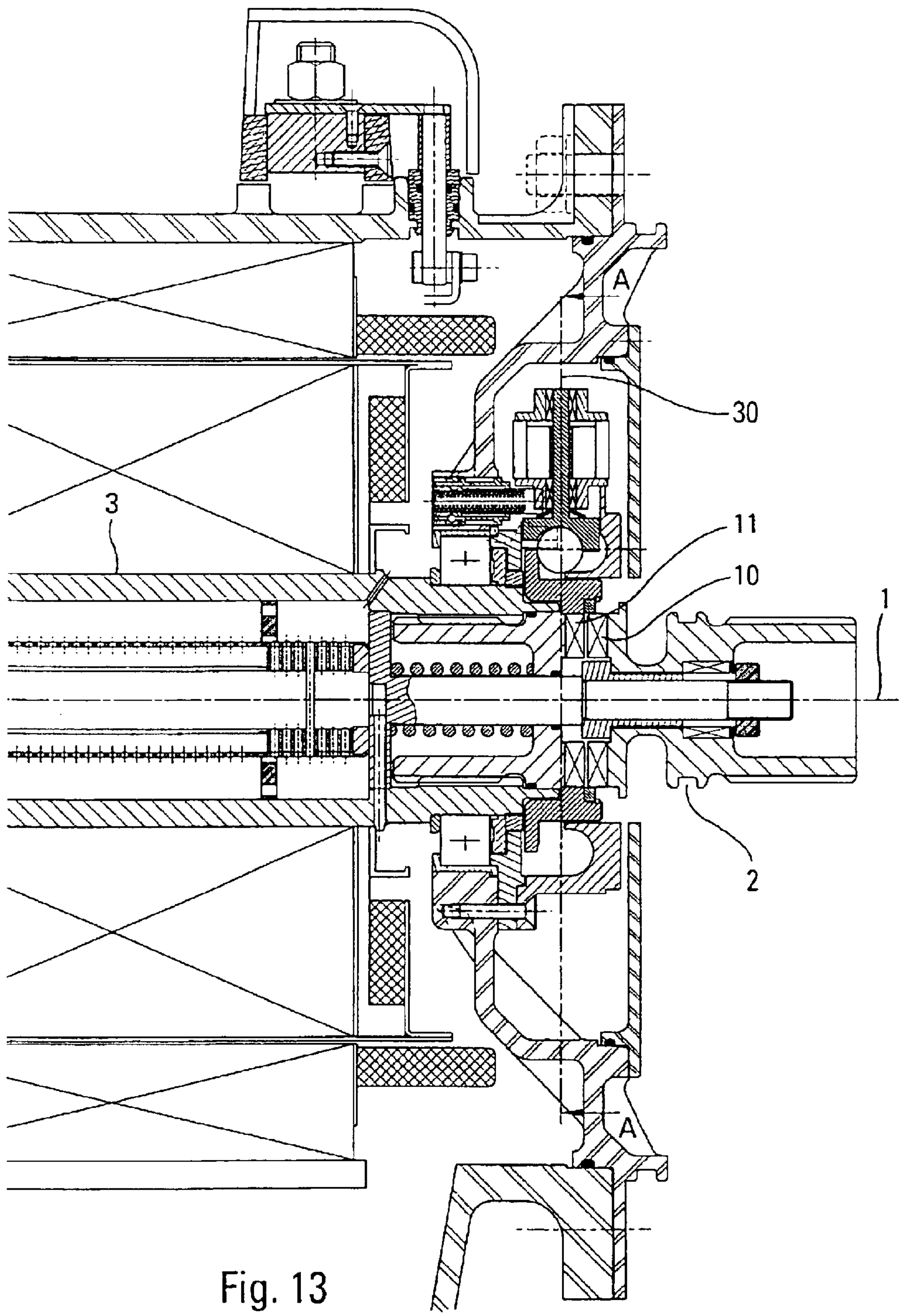
Figure 14:
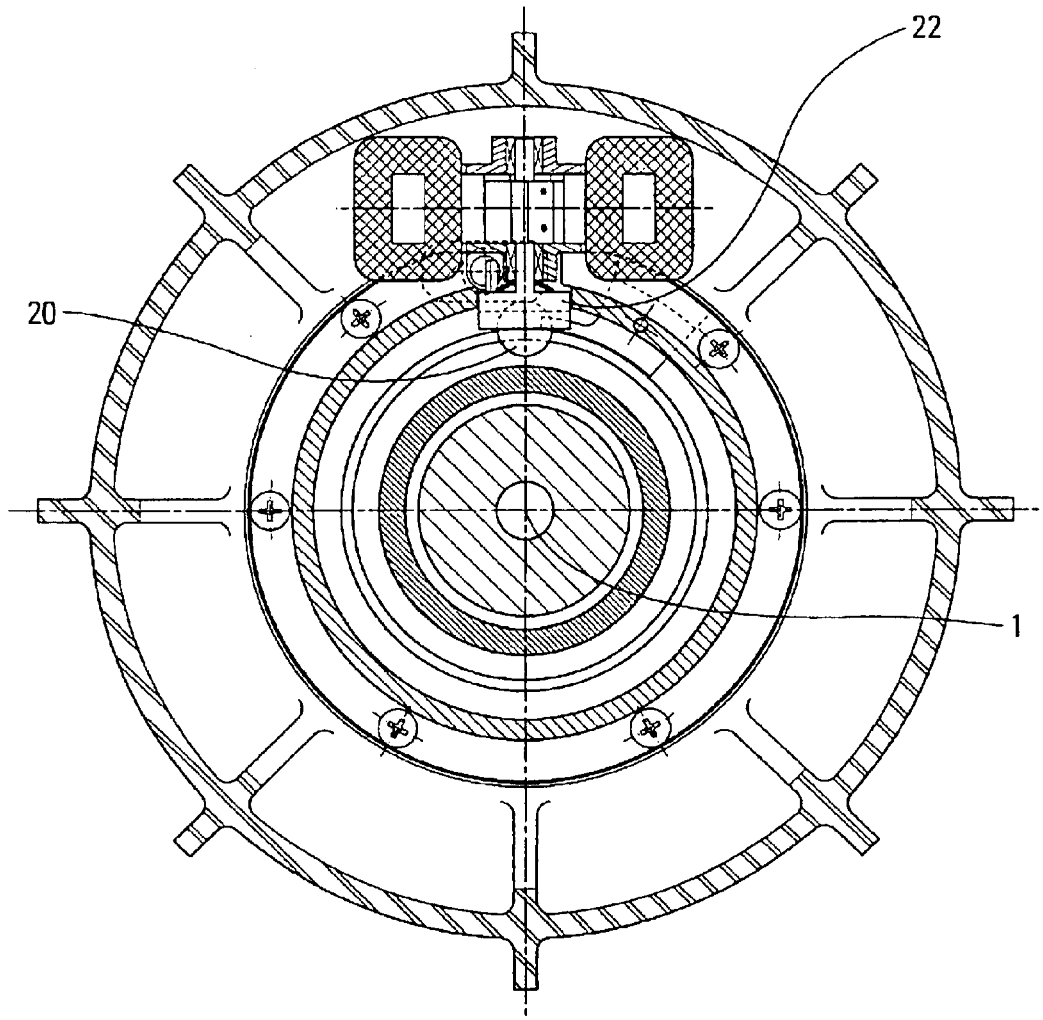
Figure 15:
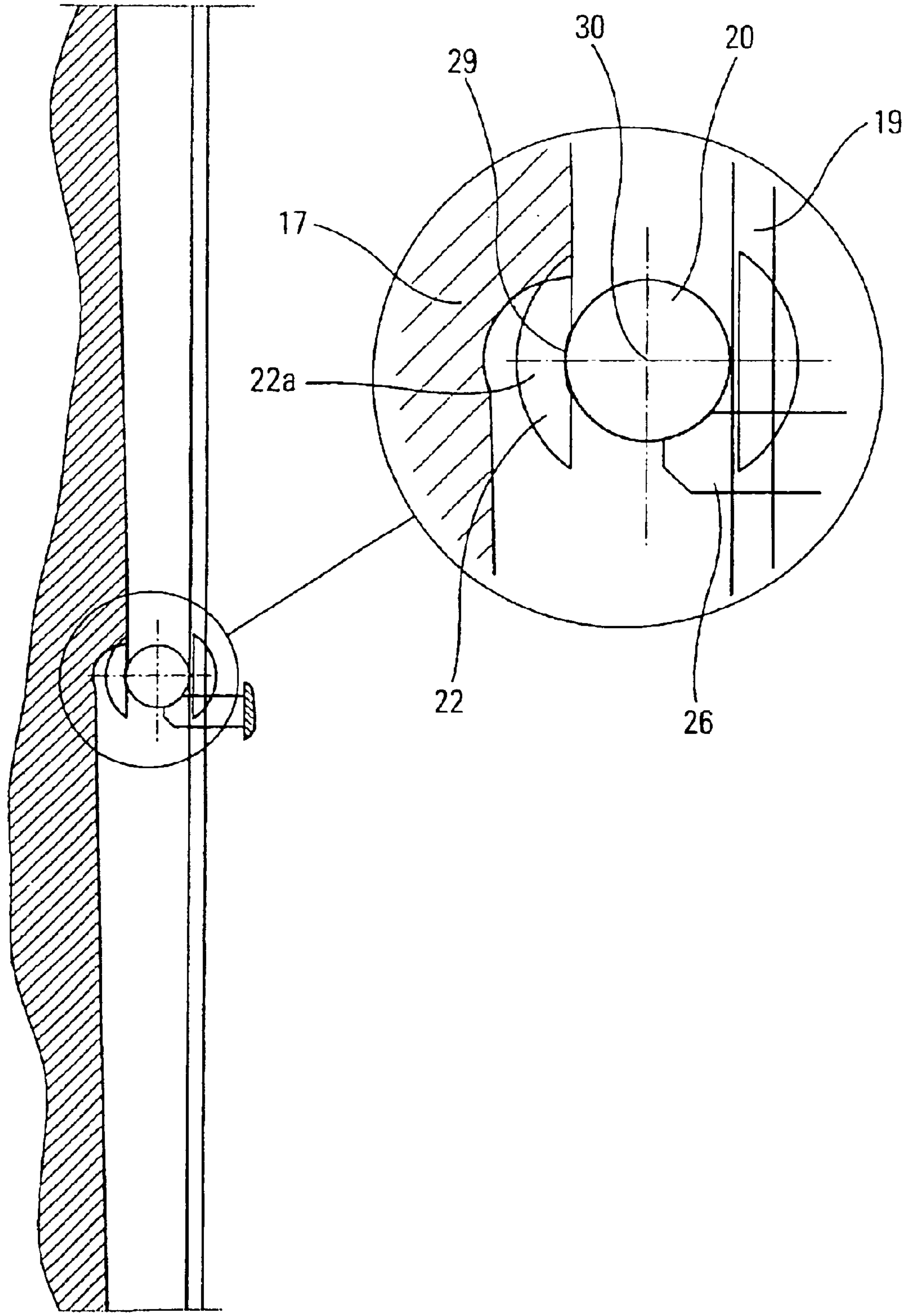
Figure 16:
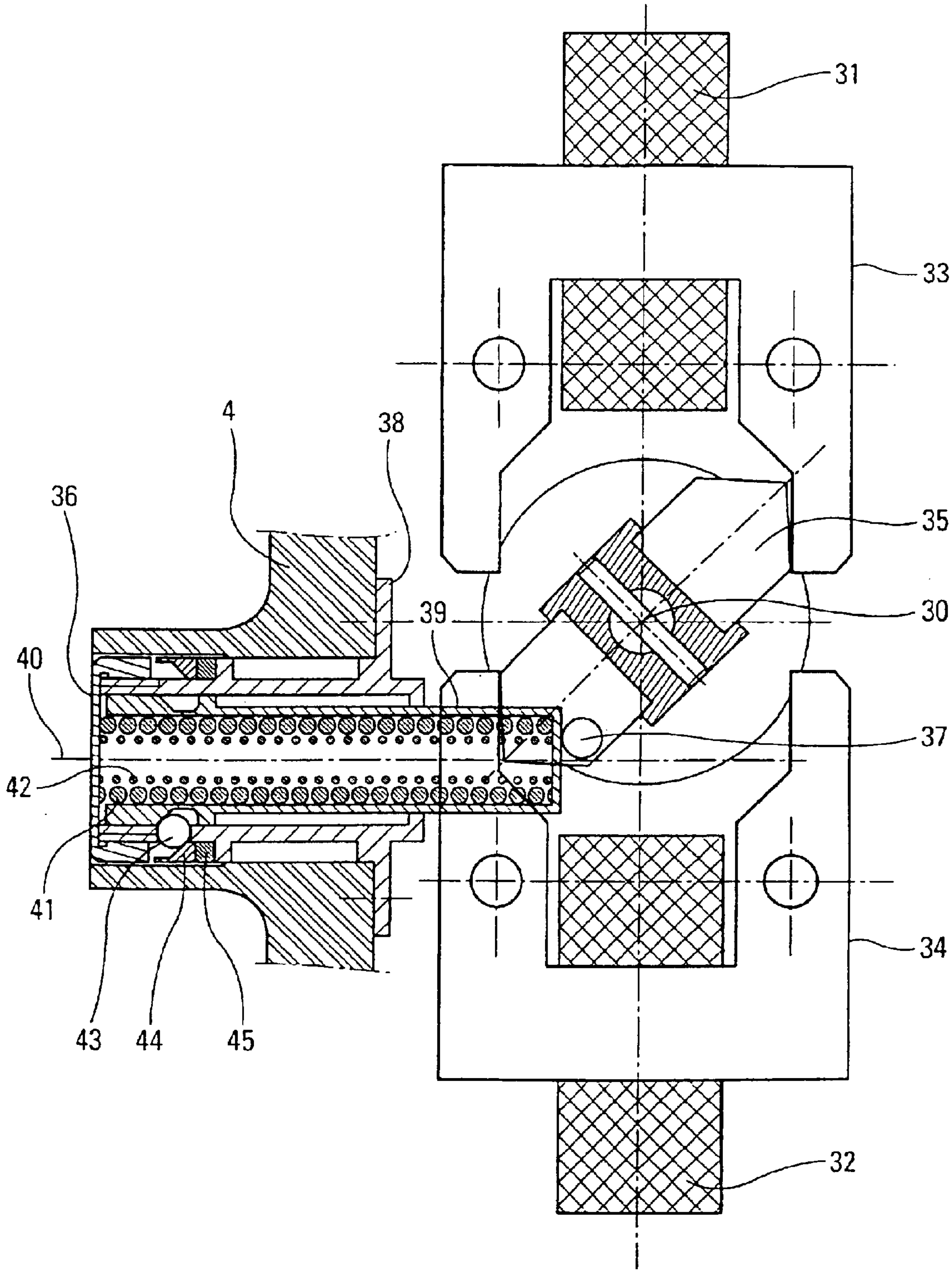
Figure 17:
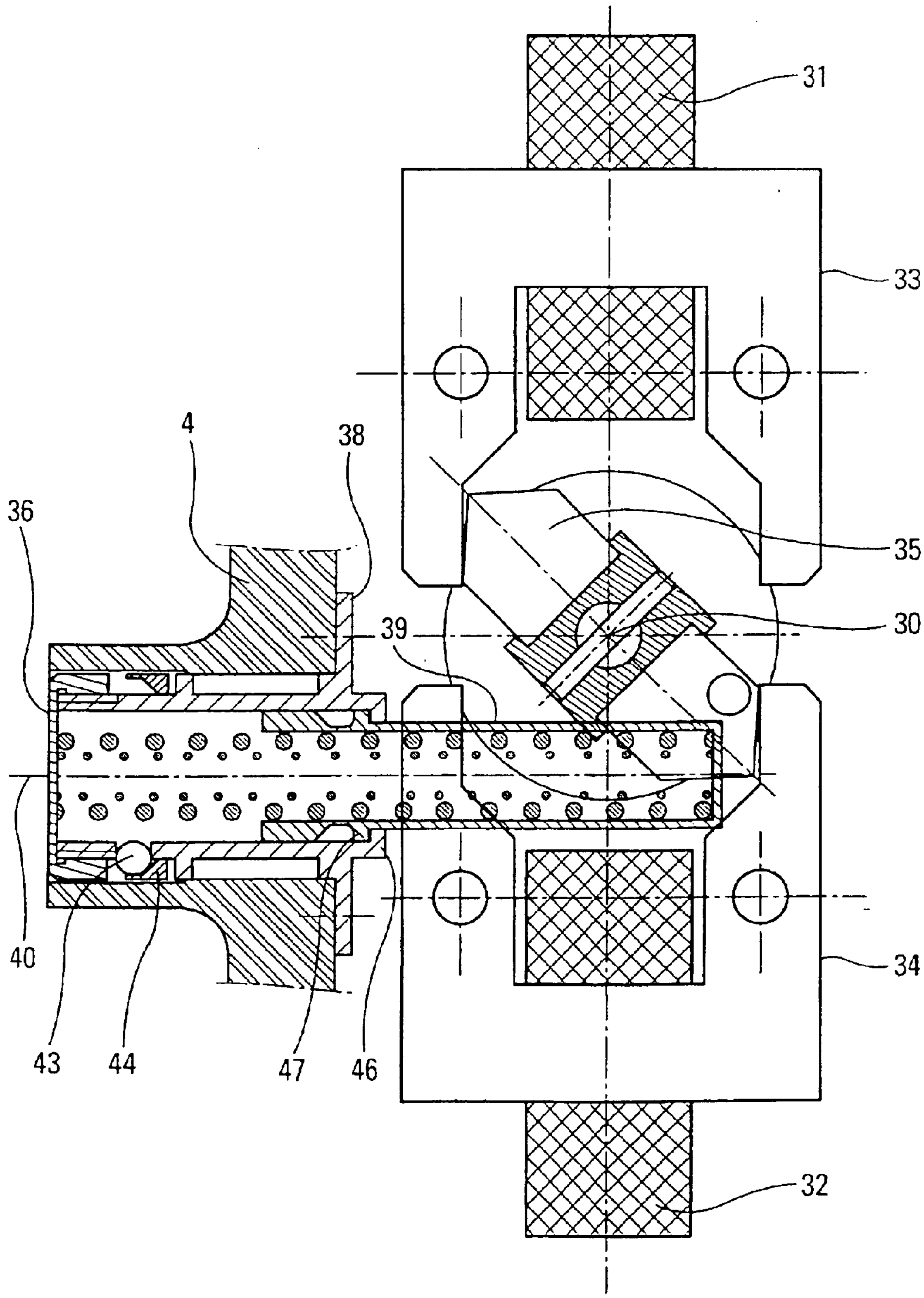
Figure 18:
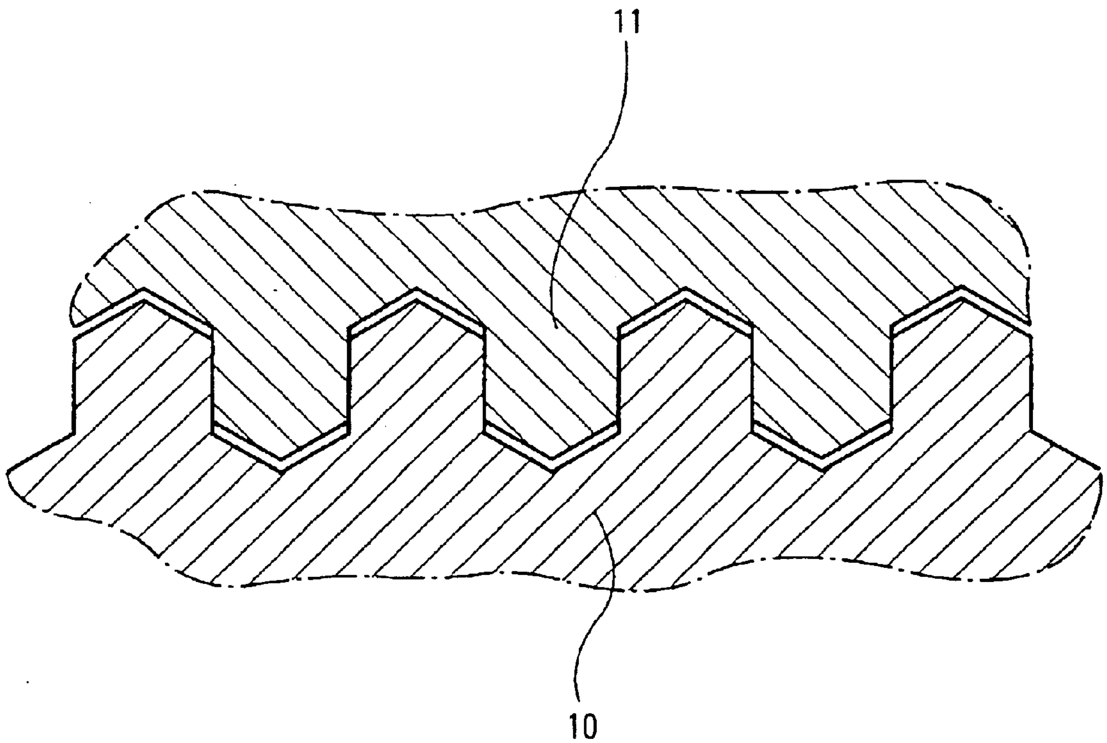

FIGS. 7, 8 and 9 once again depict the same device during clutch release;

FIGS. 10, 11 and 12 depict the device at the end of clutch release;

FIGS. 13, 14 and 15 depict the device in a clutch-released position;

FIGS. 1, 4, 7, 10 and 13 depict the device in section, the plane of section containing the axis of rotation of the shafts;

FIGS. 2, 5, 8 and 11 depict the device in section, the plane of section being perpendicular to the axis of rotation of the shafts, the position of the plane of section in FIGS. 2,

5, 8 and 11 being shown in FIGS. 1, 4, 7 and 10 by a fine chain line the ends of which each bear an arrow and a reference label A;

FIGS. 16 and 17 depict a thermal cut-out controlling the clutch release;

FIG. 18 depicts an exemplary embodiment of the teeth of the dog clutch.

To simplify the remainder of the description, the same elements will bear the same references in the various figures.

Figure 1:
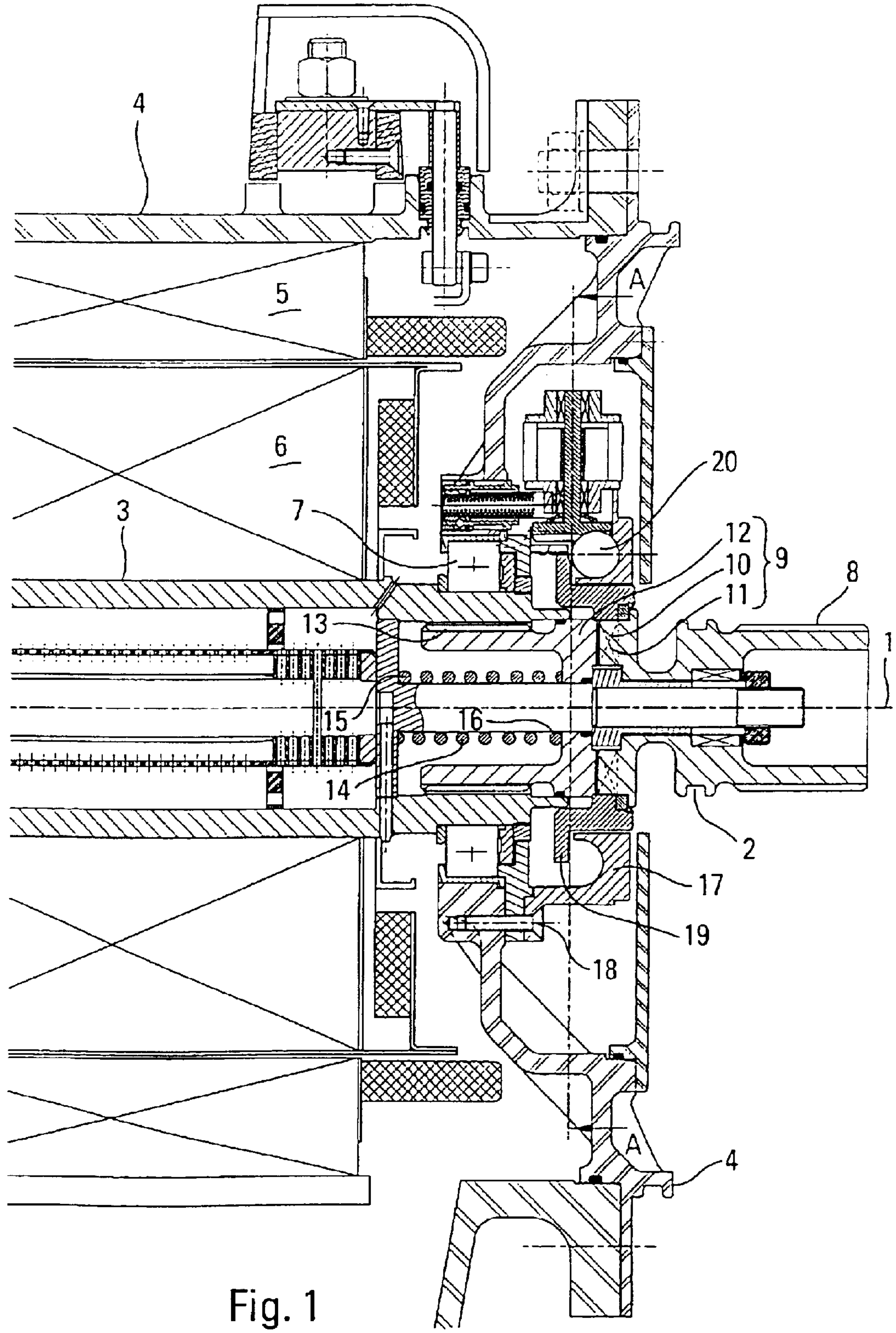
FIGS. 1, 2 and 3 depict a coupling device according to the invention in the clutch-engaged position.

In FIG. 1, a coupling device is depicted in section on a plane containing an axis 1 about which two shafts 2 and 3 can rotate with respect to a casing 4. The shaft 3 for example is that of the rotor of an electric motor. Stator windings 5 of the motor are secured to the casing 4 and rotor windings 6 are secured to the shaft 3. A rotating bearing comprising, for example, a rolling bearing 7 allows the shaft 3 to rotate with respect to the casing 4, rotation being about the axis 1. The shaft 2 for example allows the electric motor to be coupled to a relay box (not depicted) via splines 8.

A dog clutch 9 allows the shafts 2 and 3 to be coupled and uncoupled. In the example depicted, the dog clutch 9 comprises a first series of teeth 10 secured to the shaft 2 and a second series of teeth 11 secured to one end 12 of the shaft 3. The end 12 can move in terms of translation along the axis 1 with respect to the shaft 3. A rotational connection of the end 12 about the axis 1 with respect to the shaft 3 is provided by means of splines 13. The teeth 10 and the teeth 11 collaborate with one another to allow the shaft 2 to be driven by the shaft 3 when the coupling device is in the clutch-engaged position. Of course the invention is not limited to the driving of the shaft 2 by the shaft 3. The opposite is also possible for example if the electric motor is used in electric current generator mode.

A helical spring 14 tends to keep the teeth 10 and 11 in contact. The spring 14 bears at its first end 15 against the shaft 3 and at its second end 16 against the end 12. When the teeth 11 and 12 are in contact, the coupling device is in the clutch-engaged position.

Clutch-release means allow the dog clutch 9 to be uncoupled. More specifically, these means allow the teeth 10 to be separated from the teeth 11 to obtain a clutch-released position for the coupling device.

The clutch-released position will be described later on with the aid of FIGS. 13 to 15. To move the teeth 10 away from the teeth 11, the clutch release means compress the spring 14 by performing a translational movement of the end 12 with respect to the shaft 3.

According to the invention, the clutch-release means comprise a ramp 17 with a helical shape about the axis 1. The ramp 17 is secured to the casing 4. The ramp 17 is for example fixed to the casing 4 by screws 18. The clutch-release means also comprise a flat disk 19 secured to the shaft 3 or more specifically to its end 12. The clutch-release means also comprise an element, for example a ball 20, intended to roll between the ramp 17 and the disk 19 so as to cause the translational movement of the end 12 of the shaft 3 with respect to the casing 4 more or less along the axis 1. The shape of the ramp 17 is dependent on the shape of the element rolling along it. More specifically, when the element is a ball 20, the ramp 17 has the shape of a channel section in which the ball 20 can roll. Two sections of the ramp 17 are visible in FIG. 1 and are in the shape of a U. For the remainder of the description, the term ball 20 will be used to denote the element. Of course, this term does not restrict the invention to a spherical element. The invention can be embodied for other shapes of element such as, for example, a cylindrical or tapered roller. The shape of the element needs to be chosen so that it can roll between the ramp 17 and the disk 19, and the shape of the ramp needs to be tailored accordingly in order to able to guide said element.

Furthermore, the shape of the ramp 17 allows the ball 20 to make one revolution about the axis 1 during the clutch-release operation. For a better view of the shape of the ramp 17, reference is made to FIG. 2 which depicts the device already described in FIG. 1, in the plane of section AA perpendicular to the plane of FIG. 1. In FIG. 2, the ramp 17 can be seen as a circle centered on the axis 1.

Figure 3:
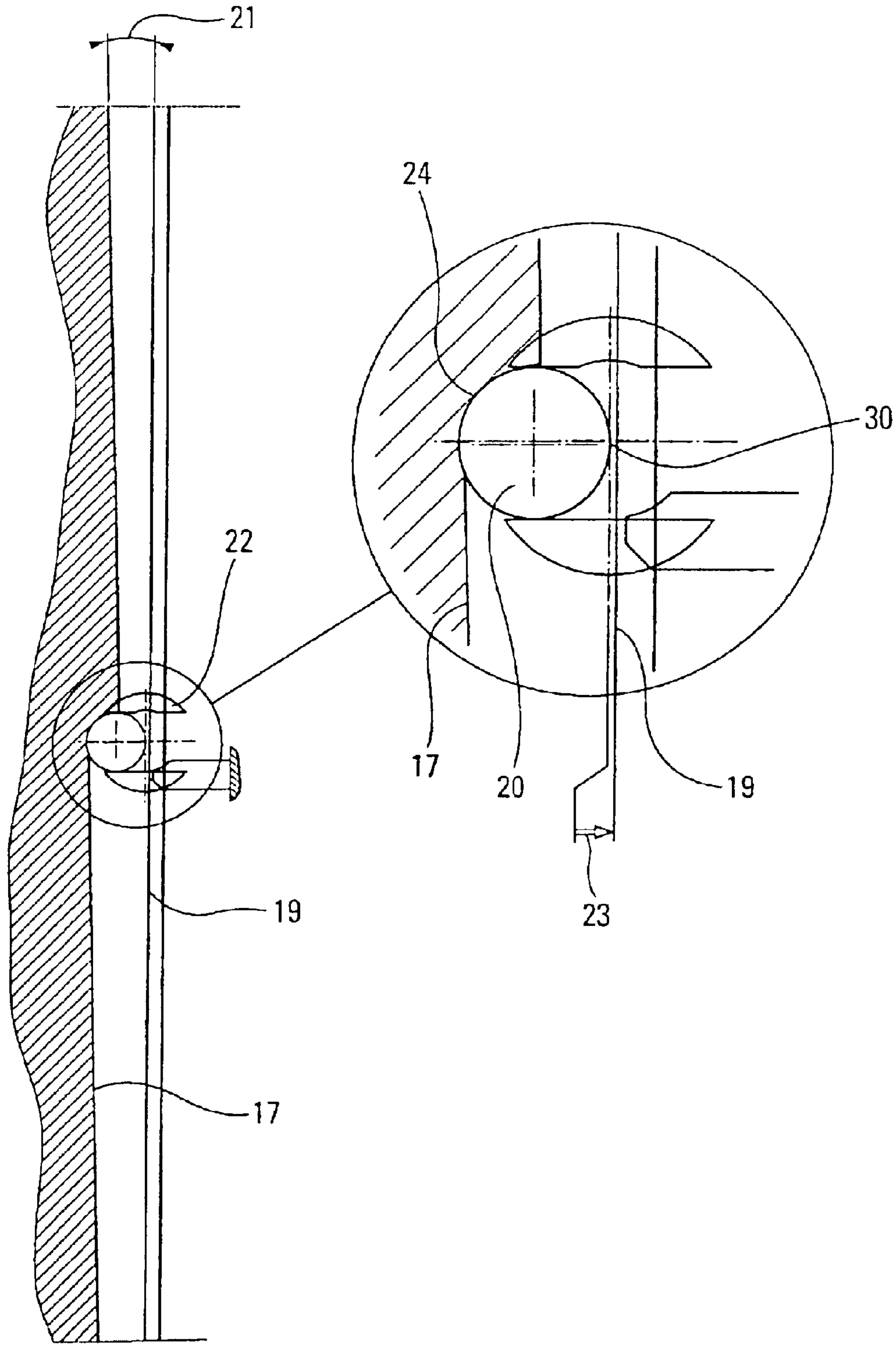

FIG. 3 depicts, in a clutch-engaged position, the clutch-release means in a developed view. More specifically, the ramp 17 is projected onto a cylinder of circular base of axis 1. The cylinder is then opened out flat in the plane of FIG. 3. It is thus possible to see in this figure the helix angle 21 of the ramp 17 with respect to the disk 19 which is more or less perpendicular to the axis 1. The method of depiction as a developed view will be used again for FIGS. 6, 9, 12 and 15.

FIG. 3 also shows means 22 for keeping the ball 20 pressed against the ramp 17 when the coupling device is in the clutch-engaged position. Advantageously, the means 22 ensure that there is a functional clearance 23 between the ball 20 and the disk 19 in the clutch-engaged position. The functional clearance is better visible in an enlarged part view 24, this part view being centered around the ball 20 and also shown in FIG. 3. This functional clearance 23 makes it possible to avoid the ball rubbing against the disk 19 when the coupling device is in the clutch-engaged position. Specifically, as the ramp 17 is secured to the casing 4 and the disk 19 is secured to the shaft 3, a relative movement of the disk 19 with respect to the ramp 17, which exists in the clutch-engaged position when the shaft 3 is rotating about the axis 1, would lead to friction and, ultimately, to wear of the ball 20 if the functional clearance 23 were not present.

The means 22 have, for example, the shape of a fork which, in the clutch-engaged position, prevents the ball 20 from rolling along the ramp 17.

Figure 4:
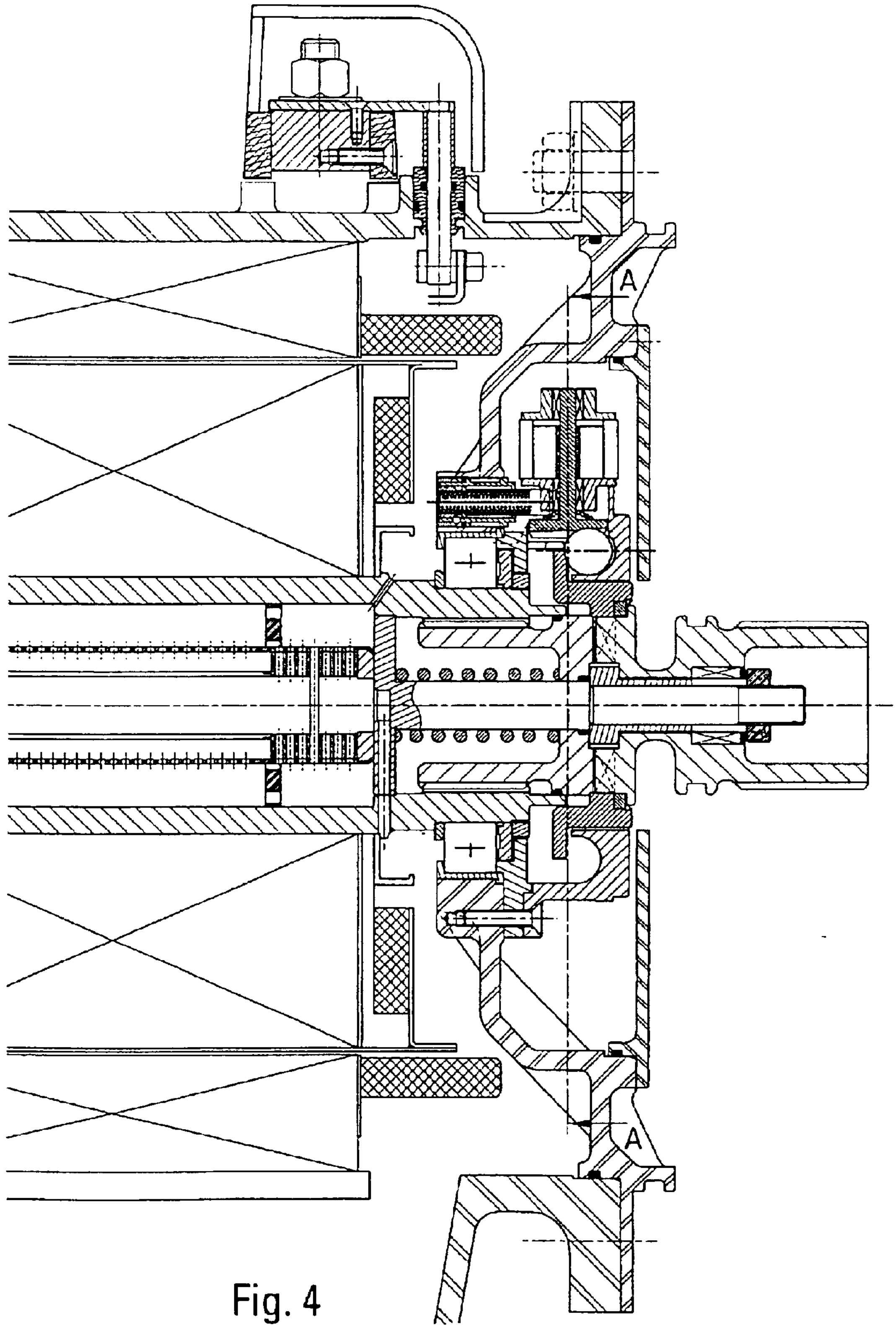
FIGS. 4, 5 and 6 depict the same device during the start of clutch release.
Figure 5:
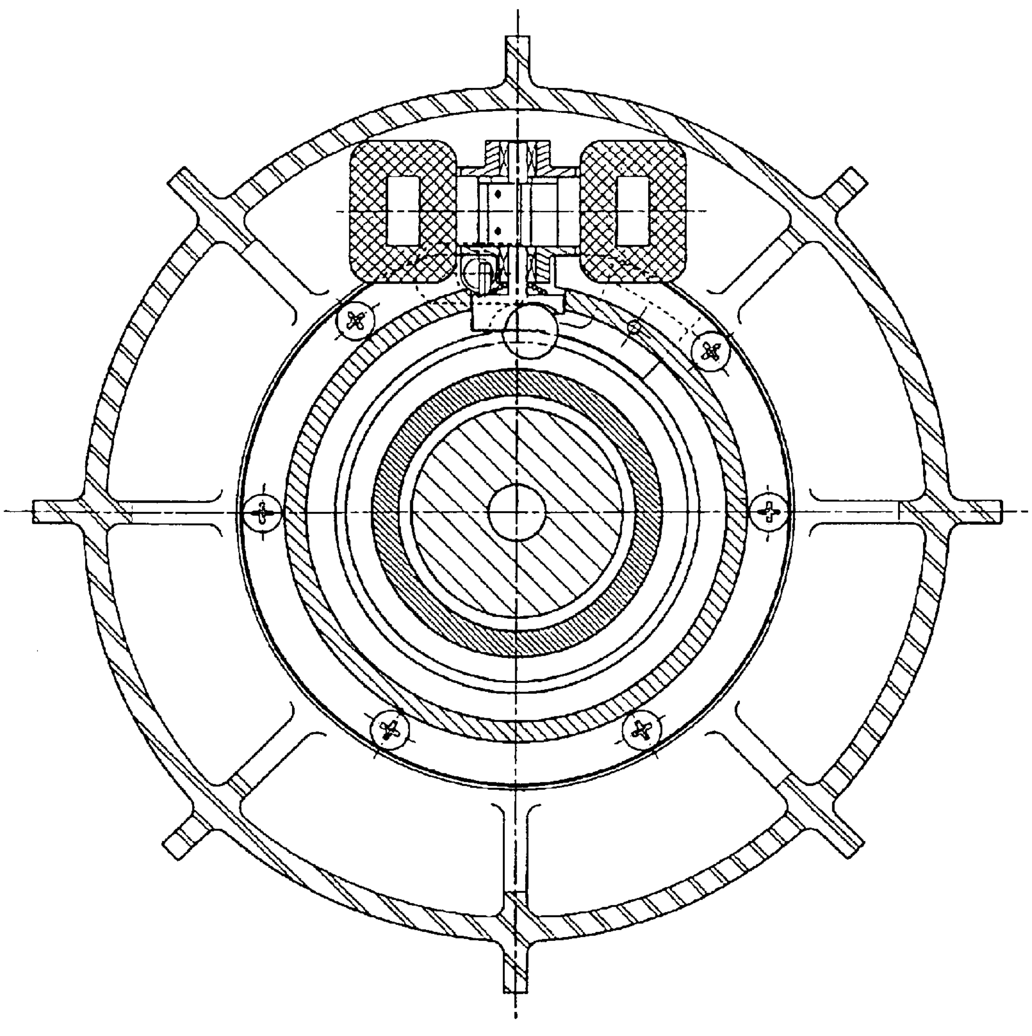
Figure 6:
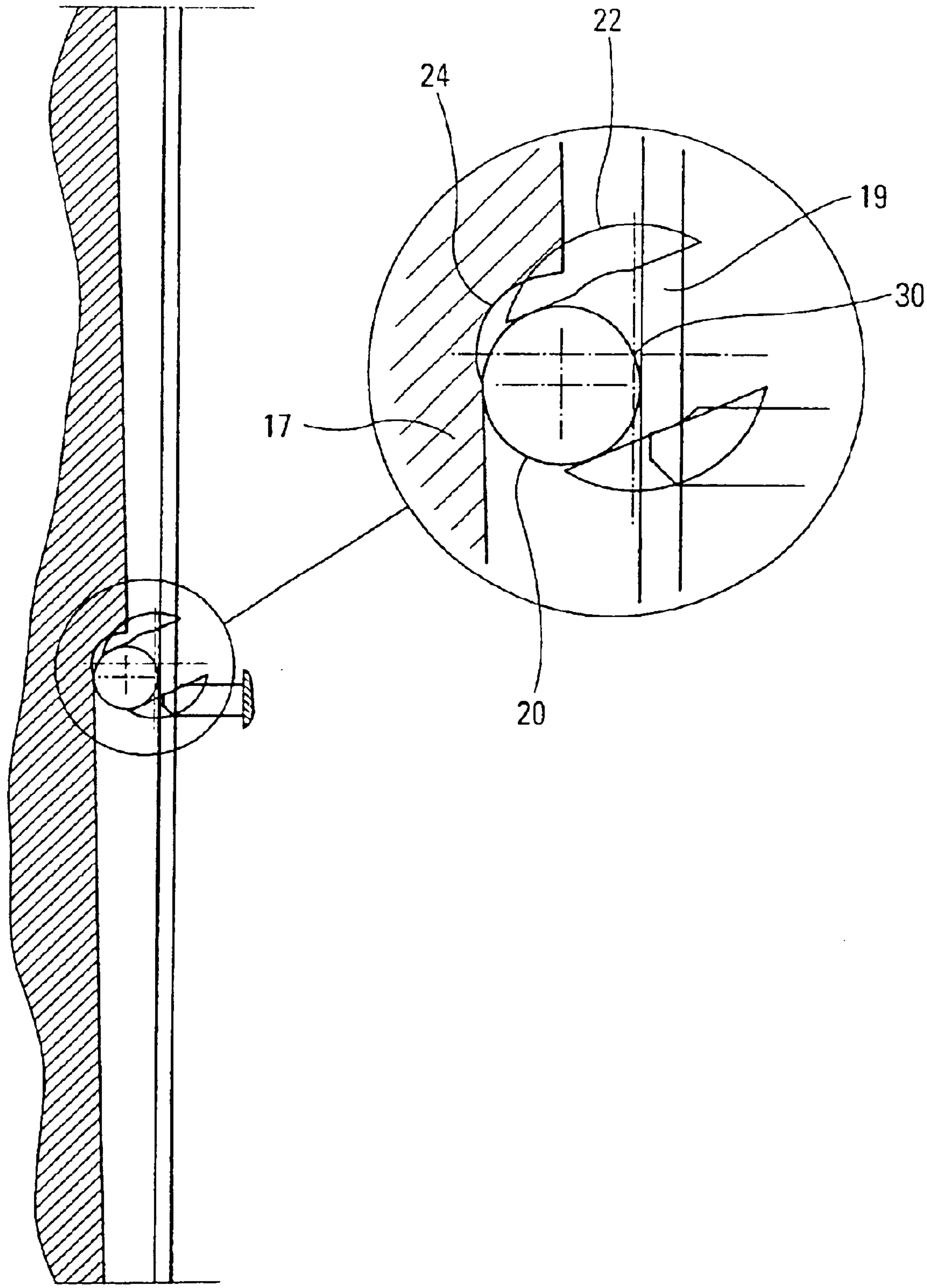

At the start of clutch release, which position is visible in FIGS. 4, 5 and 6, the fork, or more generally the means 22, move the ball 20 to bring it into contact both with the disk 19 and with the ramp 17. To simplify the remainder of the description, the fork will bear the topological reference 22. However, it must be clearly understood that the means 22 are not restricted to a component in the shape of a fork.

Figure 7:
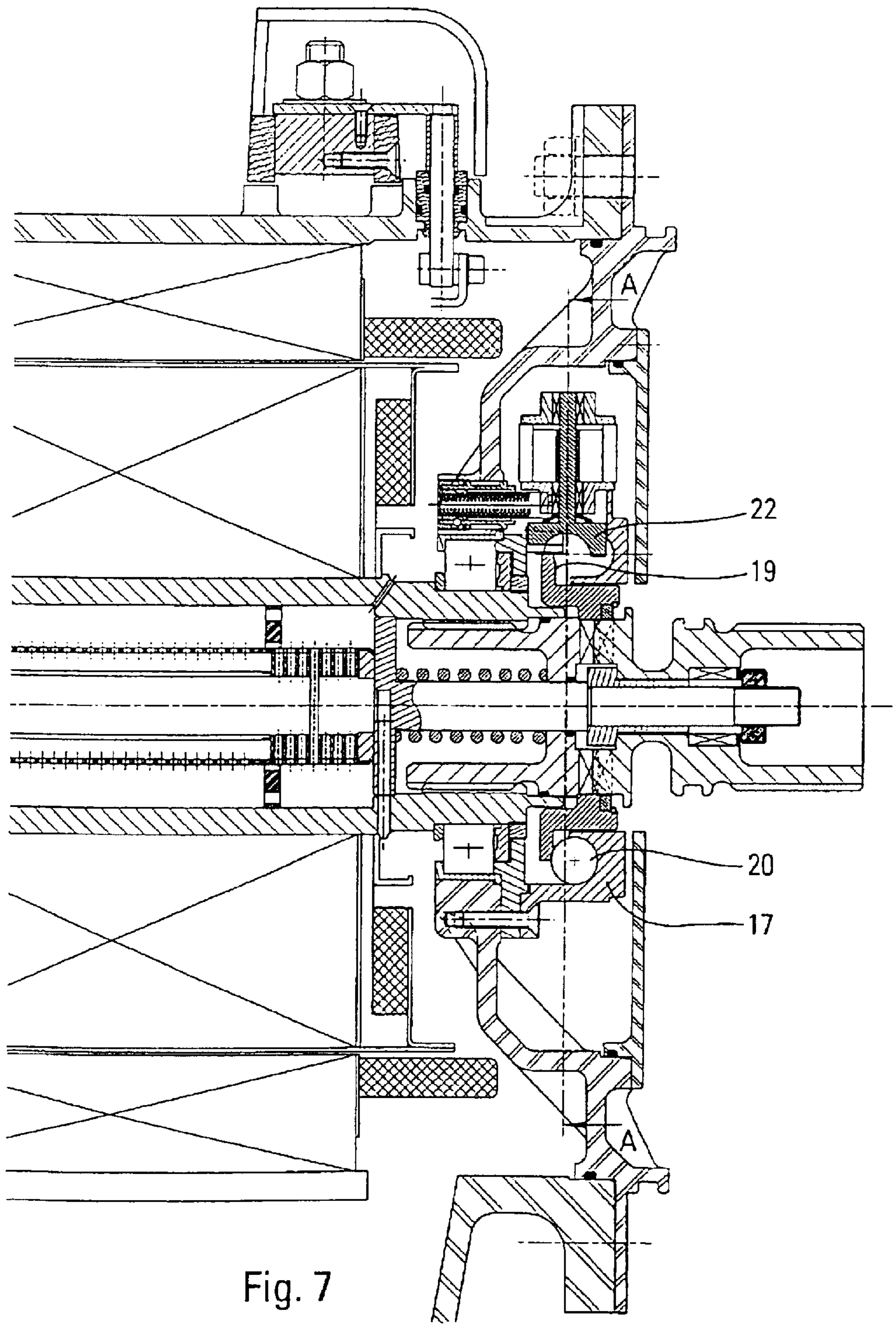
Figure 8:
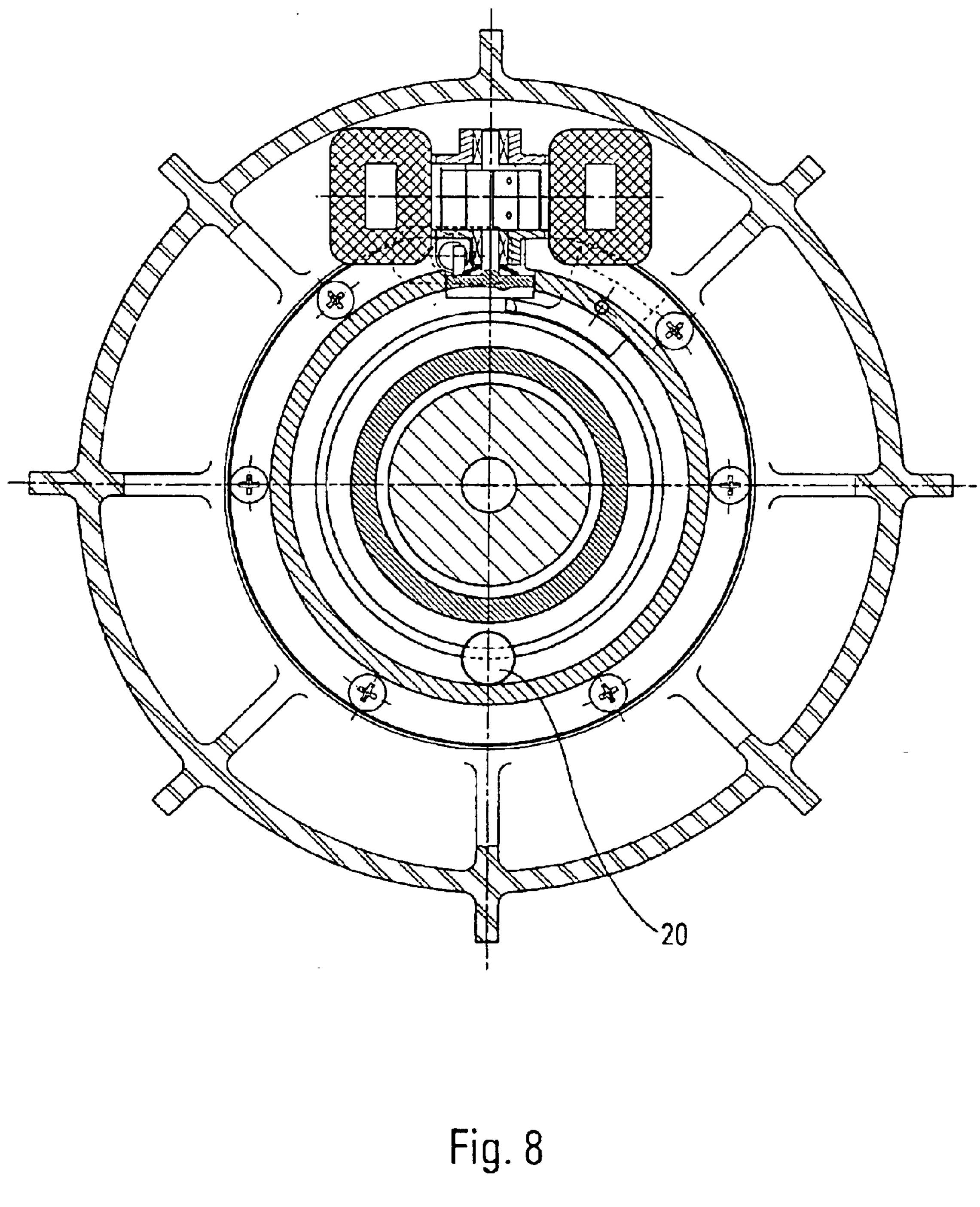
Figure 9:
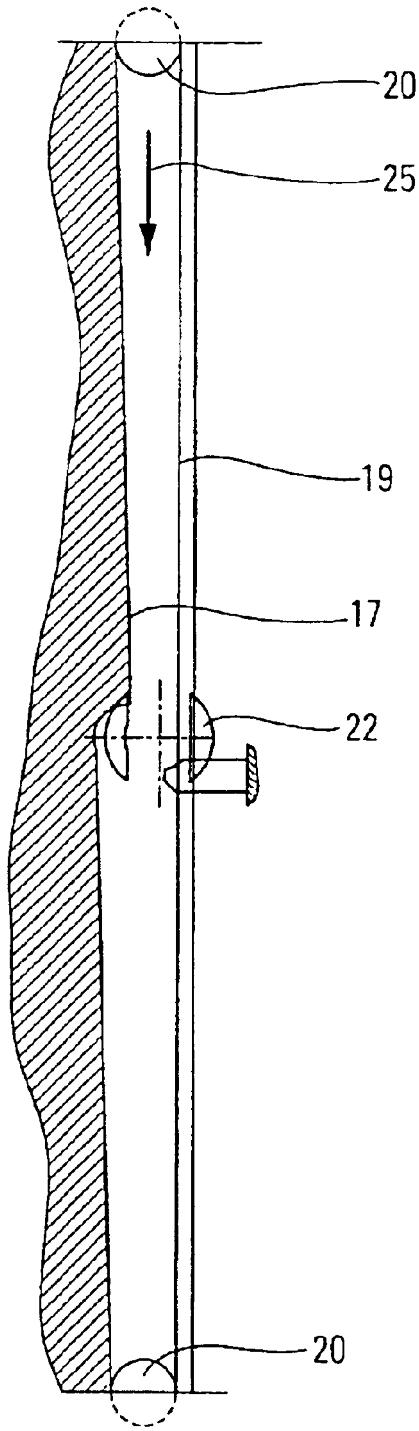

When the ball 20 has left the hollow 24 in which it lay during the clutch-engaged position, it finds itself in contact both with the ramp 17 and with the disk 19. The rotation of the disk 19 with respect to the ramp 17 drives the ball 20 between the disk 19 and the ramp 17. A position in which the ball 20 rolls between the disk 19 and the ramp 17 is depicted in FIGS. 7, 8 and 9. The rotation of the ball 20 therefore separates the disk 19 from the ramp 17. This is a translational movement along the axis 1. This movement forces the teeth 10 and 11 apart. The position depicted in FIGS. 7 to 9 is fleeting, in which position the ball 20 rolls between the disk 19 and the ramp 17 without stopping.

The materials of the ramp 17, of the disk 19 and of the ball 20, and the helix angle 21, are chosen so that the ball 20 rolls without slipping between the ramp 17 and the disk 19. More specifically, the coefficients of friction between, on the one hand, the ball 20 and the ramp 17 and, on the other hand, the ball 20 and the disk 19, need to be very much greater than the helix angle 21. The coefficient of friction between two materials is defined as the minimum angle of inclination that the direction of a force exerted on a first component made of one of the materials, which component is placed on a second component made of the other material, adopts such that the first component can slide with respect to the second. Values of coefficients of friction for pairs of materials are commonly found in the literature, these values being defined by the tangent of the minimum angle of inclination.

In FIG. 9, which is a developed view, the direction of travel of the ball 20 is embodied by the arrow 25.

FIGS. 10, 11 and 12 depict the device at the end of clutch release. The ball 20 has finished its travel along the ramp 17 and has been halted in its path by a stop 26 comprising a contact region 27 intended to accommodate the ball 20. Advantageously, the contact region 27 is more or less in the shape of a portion of a hollow sphere of the same diameter as the ball 20 so as to spread the force of contact between the ball 20 and the stop 26 and thus avoid any damage to the stop 26 or to the ball 20. If, as a replacement for the ball 20, use is made of an element that does not have a spherical shape, the shape of the contact region 27 of the stop will of course be halted accordingly. Indeed, clutch release can be done when the shafts 2 and 3 are rotating. The ball 20 travels over the entirety of the ramp 17 when the shaft 3 makes two revolutions about the axis 1. In consequence, the higher the rotational speed of the shaft 3, the faster the ball 20 will accomplish its travel and, accordingly, the more violent the impact between the stop 26 and the ball 20 will be. The material and dimensions of the stop 26 and of the ball 20 are therefore chosen according to the maximum rotational speed of the shaft 3, at which speed a clutch-release operation is permitted.

In the position depicted in FIGS. 10, 11 and 12, the ball 20 has completed its travel against the stop 26 but has not yet reached its position of rest in the clutch-released position. There remains a clearance 28 between the fork 22 and the ball 20 or, more specifically, between a slightly recessed housing 28 made in the fork 22. The position depicted in FIGS. 10, 11 and 12 is short-lived because the spring 14 tends to push the disk back toward the ramp 17. The ball 20 is therefore pushed back into the housing 29 of the fork 22. This position of the ball 20 corresponds to the clutch-released position of the device, which position is depicted in FIGS. 13, 14 and 15. In this position, the teeth 10 secured to the shaft 2 and the teeth 11 secured to the shaft 3 are uncoupled and clutch release has effect. More specifically, the shaft 2 and the shaft 3 can rotate independently of one another about the axis 1.

Advantageously, the shape of the ramp 17 allows the ball 20 to make a rotation of about one revolution about the axis 1 during the clutch-release operation. This revolution can easily be seen by comparing FIGS. 2 and 14. FIG. 2 depicts the device in the clutch-engaged position and FIG. 14 in the clutch-released position. In these two figures, the ball 20 has more or less the same angular position about the axis 1. Between these two positions, the ball 20 has more or less made one revolution about the axis 1. This more or less identical angular position about the axis 1 between these two positions allows the device to engage in a simple way. Clutch engagement consists in moving from the clutch-released position to the clutch-engaged position.

To engage the clutch, all that is required is for the fork 22 to pivot in order thus to cause the ball 20 to drop into the housing 24 of the ramp 17. The pivoting of the fork 22 is about an axis 30 secant with the axis 1. In the clutch-release position, the axis 30 passes through the ball 20 more or less at its center. The pivoting of the fork 22 can also be seen in the developed FIGS. 3, 6, 9 and 12. Indeed, in these figures, the axis 30 is more or less perpendicular to the plane of the figures. Between the clutch-engaged position and the clutch-release position, the fork 22 has more or less effected a quarter of a revolution about the axis 30. In the clutch-release position visible in FIG. 15, the left-hand part 22*a* of the fork, in which part the housing 29 is made, is situated more or less in the continuation of the ramp 17 in the direction in which the ball 20 moves when it reaches the clutch-release position.

Control of the pivoting of the fork may be electromagnetic for example, by means of a winding 31 and 32 visible in FIG. 2. To ensure that the device is suitably safe, the fork 22 may be in the clutch-engaged position when an electric current is passing through the windings 31 and 32. In the absence of electric current in the windings 31 and 32, the fork 22 pivots to reach its clutch-release position. Thus, a failure in the power supply will immediately lead to the clutch-release of the device.

FIGS. 16 and 17 depict means of controlling the fork 22 in a view from above perpendicular to the axis 30. Magnetic circuits 33 and 34 pass through the windings 31 and 32. The magnetic circuits 33 and 34, and the windings 31 and 32, form a fixed part or stator of electromagnetic control means for controlling the fork 22. A moving part 35 can pivot about the axis 30 and, secured to the fork 22, forms the rotor of the electromagnetic control means for controlling the fork 22.

To further increase the safety of the coupling device, the fork may advantageously be controlled by a thermal cut-out 36. More specifically, when the temperature within the device exceeds a given value, the thermal cut-out 36 cuts out and causes the fork 22 to rotate for example by exerting a force on a finger 37 secured to the fork 22. The finger 37 is for example arranged on the fork 22 or on the moving part 35 in such a way that the force exerted by the thermal cut-out 36 generates enough of a moment to cause the fork 22 to pivot about the axis 30.

FIG. 16 depicts the rotor 35 and the thermal cut-out 36 in the clutch-engaged position. FIG. 17 depicts the thermal cut-out 36 after it has been triggered and shows the corresponding position of the rotor 36.

The thermal cut-out 36 comprises for example a sleeve 38 secured to the casing 4. Inside the sleeve 38, a piston 39 can move in terms of translation along an axis 40 to exert the force that causes the fork 22 to pivot. In the position depicted in FIG. 16, one or more springs, in this instance two coaxial springs 41 and 42, are compressed between the piston 39 and the sleeve 38. A ball 43 locks the relative position of the piston 39 with respect to the sleeve 38. A cam 44 holds the ball 43 in this position. A fusible element 45 blocks the cam 44. When the fusible element 45 melts under the effect of excessive temperature, the cam 44 can become inserted into the space freed by the melting of the fusible element 45, thus allowing the ball 43 to disengage. The piston 39 is thus unlocked. It can move in terms of translation along the axis 40 under the action of the springs 41 and 42. FIG. 17 depicts the thermal cut-out 36 after action of the springs 41 and 42.

Stops 46 and 47 limit the translational movement of the piston 39 with respect to the sleeve 38. The stop 46 belongs to the sleeve 38 and the stop 47 belongs to the piston 39. These stops 46 and 47 come into contact under the action of the springs 41 and 42 after the thermal cut-out 36 has been triggered.

The triggering of the thermal cut-out 36 is irreversible and the coupling device cannot be reengaged without human intervention within the device, which intervention consists, for example, in replacing or resetting the thermal cut-out 36.

FIG. 18 depicts an exemplary embodiment of the teeth of the dog clutch. FIG. 18 is a developed view just like FIGS. 3, 6, 9, 12 and 15. The crests of the teeth 10 and 11 in this instance are chamfered. This makes reengagement easier, which reengagement can be achieved regardless of the relative angular position of the shafts 2 and 3, about the axis 1. Other shapes of the teeth 10 and 11 also allow reengagement to be facilitated. By way of example, it is possible to produce the sides of the teeth 10 and 11 in a curve in the form of an involute to a circle.

What is claimed is:

1. A device for coupling two shafts intended to rotate with respect to a casing about an axis comprising:

a dog clutch allowing one of the shafts to drive the other and clutch-release means allowing the dog clutch to be uncoupled, characterized in that the clutch-release means comprise a ramp secured to the casing, the ramp having a helical shape around tho axis, a flat disk secured to the first shaft the plane of which is substantially perpendicular to the axis, an element intended to roll between the ramp and the disk so as to cause a translational movement of the first shaft with respect to the casing more or less along the axis, the translational movement allowing the dog clutch to be uncoupled.

2. The device as claimed in claim 1, wherein the element intended to roll is a ball.

3. The device as claimed in claim 1, wherein the shape of the ramp allows the element to rotate through about one revolution about the axis during the clutch-release operation.

4. The device as claimed in claim 1, further comprising first means for keeping the element pressed against the ramp in the clutch-engaged position.

5. The device as claimed in claim 4, wherein the first means ensure that there is a functional clearance between the element and the disk.

6. The device as claimed in claim 4, wherein, at the start of clutch release, the first means move the element to bring it into contact with the disk and with the ramp.

7. The device as claimed in claim 6, further comprising second means for controlling the movement of the first means which movement allows the element to be moved.

8. The device as claimed in claim 7, wherein the second means comprise electromagnetic third means.

9. The device as claimed in claim 7, wherein the second means comprise a thermal cut-out.

10. The device as claimed in claim 1, wherein said devise has a stop to halt the rolling of the element at the end of clutch release.

11. The device as claimed in claim 5, wherein, at the start of clutch release, the first means move the element to bring it into contact with the disk and with the ramp.

12. The device as claimed in claim 8, wherein the second means comprise a thermal cut-out.

* * * * *